US007588800B2

(12) United States Patent
Crump

(10) Patent No.: US 7,588,800 B2
(45) Date of Patent: Sep. 15, 2009

(54) IN-MOLD COATING BY A MULTIPLE STEP INFUSION PROCESS

(75) Inventor: L. Scott Crump, Gladstone, MO (US)

(73) Assignee: Cook Composites & Polymers Co., North Kansas City, MO (US)

( * ) Notice: Subject to any disclaimer, the term of this patent is extended or adjusted under 35 U.S.C. 154(b) by 503 days.

(21) Appl. No.: 11/116,956

(22) Filed: Apr. 28, 2005

(65) Prior Publication Data

US 2005/0255770 A1 Nov. 17, 2005

Related U.S. Application Data

(60) Provisional application No. 60/566,384, filed on Apr. 29, 2004.

(51) Int. Cl.
*B05D 3/00* (2006.01)
(52) U.S. Cl. .................. 427/294; 428/212; 428/438; 428/515; 428/520
(58) Field of Classification Search .............. 427/294; 428/438, 212, 515, 520
See application file for complete search history.

(56) References Cited

U.S. PATENT DOCUMENTS

| 3,480,497 | A | * | 11/1969 | Menzer et al. | ............... | 156/155 |
| 3,981,955 | A | * | 9/1976 | Otani et al. | ............... | 264/255 |
| 6,048,488 | A | * | 4/2000 | Fink et al. | ............... | 264/510 |
| 2003/0104738 | A1 | * | 6/2003 | Porter | ............... | 442/134 |

OTHER PUBLICATIONS

Posen Chiu, Masters Thesis from The Florida State University College of Engineering entitled "In-Mold Coating of Composites Manufactured with the Resin Infusion between Double Flexible Tooling Process by Means of Co-Infusion" defended on Jun. 7, 2004.*
O.I. Okoli "Development of the Resin Infusion between Double Flexible Tooling Process—Assessment of the Viability of In-Mold Coating and Implementation of UV Curing" Sandia Report, SAND2004-5970, Unlimited release, printed Dec. 2004.*
Gillio et al "Investigation of the Role of Transverse Flow in Co-Injection Resin Transger Molding" Polymer Composites, Dec. 1998, vol. 19, No. 6.*

* cited by examiner

*Primary Examiner*—Michael Cleveland
*Assistant Examiner*—Nathan H Empie
(74) *Attorney, Agent, or Firm*—Whyte Hirschboeck Dudek SC

(57) ABSTRACT

A coating may be incorporated in a molded composite article made via a process in which neither the coating nor the resin contact the mold surface. A multilayer sandwich structure is formed having two outside layers of flexible membranes, typically made of silicon. An interior dissolvable film is disposed between the two outer flexible membranes. A layer of fiber reinforcement is disposed between the dissolvable film and one of the flexible membranes. A coating is distributed between a flexible membrane and the dissolvable film, opposite the side having the reinforcement, wherein the film is only slowly soluble, or insoluble, in the coating. The coating is allowed to at least partially cure and a resin is infused through the reinforcement wherein the dissolvable film rapidly dissolves in the resin. The sandwich structure is formed around a mold and the resin is allowed to cure.

14 Claims, 3 Drawing Sheets

IN-MOLD COATING BY A MULTIPLE STEP INFUSION PROCESS

CROSS-REFERENCE TO RELATED APPLICATION

This application claims priority under 35 U.S.C. §119(e) to U.S. Provisional Patent Application No. 60/566,384, filed Apr. 29, 2004, the entirety of which is incorporated by reference herein.

BACKGROUND OF THE INVENTION

This invention relates generally to composite molding processes and more specifically to methods and apparatus for forming a skin coating on an article made by a vacuum forming process.

A new resin molding process (referred to as RIDFT Resin Infusion between Double Flexible Tooling) was recently developed by Dr. Okoli of Florida State University. The Okoli method comprises placing fiber reinforcement between two sheets of silicon film which are then pressed against the reinforcement under vacuum to effectively form a silicon bag around the reinforcement. A vacuum is applied to the bag in order to infuse a resin through and around the reinforcement. The resin filled silicon bag is placed in a vacuum chamber which has a mold and a vacuum is drawn to conform the bag around the mold. This method has the advantage of preventing contact of the sticky resin with the surface of the mold. However, traditional methods of preparing a coating over the part, such as applying the coating to the mold surface prior to laying up the reinforcement and resin, cannot be used with the new process.

BRIEF SUMMARY OF THE INVENTION

In one preferred embodiment, the invention is a method of making a coated composite article. The method comprises the steps of providing a clamp comprising an upper frame and a lower frame, wherein the clamp is operable between an open position and a closed position, the open position creating a gap between the upper frame and the lower frame and operating the clamp to the open position. Next, a first flexible membrane having an inlet opening connected to a source of resin and an outlet opening connected to a vacuum source and a second flexible membrane are positioned in the gap such that the first flexible membrane and the second flexible membrane are spaced apart from each other and the second flexible membrane has an inner surface that faces towards the first flexible membrane. A coating is applied to the inner surface of the second flexible membrane to form a coating layer. The coating layer is overlayed with a dissolvable inner film, wherein the inner film is only slowly soluble, or insoluble, in the coating and wherein the inner film is rapidly soluble in the resin. In turn the inner film is overlayed with a layer of reinforcement. The clamp is moved to the closed position and the coating is allowed to at least partially cure. Optionally, the coating may be allowed to fully cure prior to closing the mold. A vacuum is applied to the outlet opening to draw pressurized resin through the inlet opening such that the resin is infused through the reinforcement and distributed between, and in contact with, the first flexible membrane and the dissolvable film such that the inner film dissolves in the resin. Finally, after forming as desired, the resin is allowed to cure.

In another preferred embodiment, the invention is a method of making a coated composite article. The method comprises the steps of providing a clamp comprising an upper frame and a lower frame, wherein the clamp is operable between an open position and a closed position, the open position creating a gap between the upper frame and the lower frame and operating the clamp to the open position. Positioning (i) a first flexible membrane having a first inlet opening connected to a source of resin and a first outlet opening connected to a vacuum source and (ii) a second flexible membrane having a second inlet opening connected to a source of coating and a second outlet opening connected to a vacuum source, in the gap such that the first flexible membrane and the second flexible membrane are spaced apart from each other and the second flexible membrane has an inner surface that faces towards the first flexible membrane. Next, the inner surface of the second flexible membrane is overlain with a dissolvable inner film, wherein the inner film is only slowly soluble, or insoluble, in the coating and wherein the inner film is rapidly soluble in the resin. The inner film, in turn, is overlayed with a layer of reinforcement. The clamp is moved to the closed position. A vacuum is applied to the second outlet opening to draw pressurized coating through the second inlet opening such that the coating is distributed between, and in contact with, the inner surface of the lower flexible membrane and the dissolvable film. The coating is allowed to at least partially cure. A vacuum is applied to the first outlet opening to draw pressurized resin through the first inlet opening such that the resin is infused through the reinforcement and distributed between, and in contact with, the first flexible membrane and the dissolvable film. The inner film dissolves in the resin and the resin is allowed to cure.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts.

DETAILED DESCRIPTION OF THE INVENTION

Figure 1:
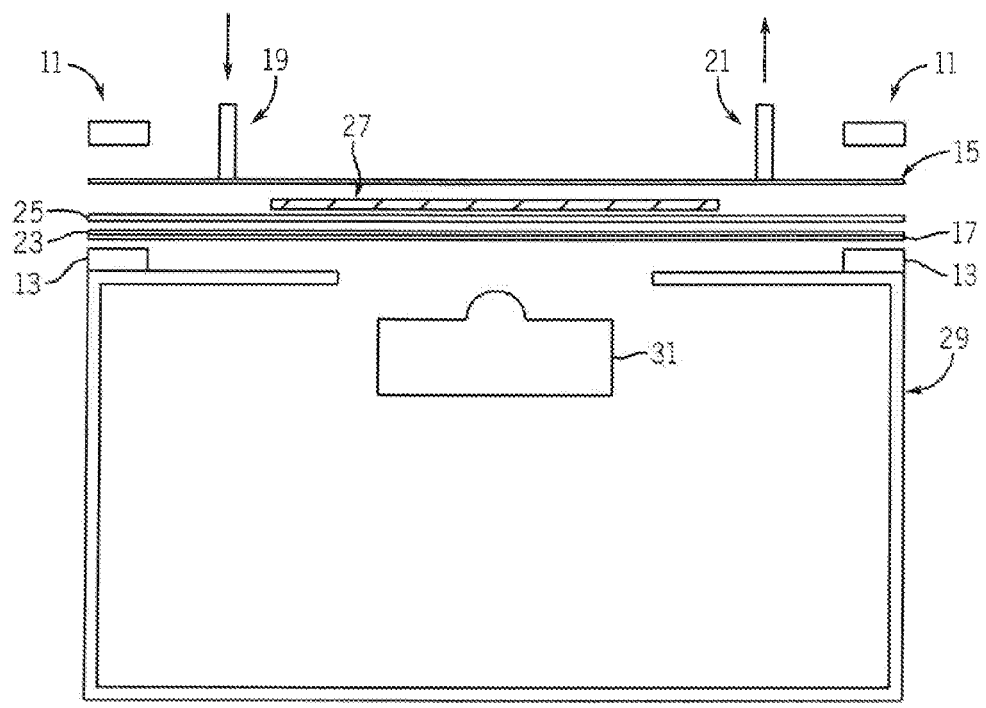
FIG. 1 shows a schematic drawing of a device for practicing a preferred embodiment of the method of the invention.

In the following detailed description, references made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the spirit and scope of the present invention.

In the process of this invention, a multilayer sandwich structure is formed. The two outside layers of the structure are flexible membranes, typically made of silicon. An interior dissolvable film is disposed between the two outer flexible membranes. A layer of fiber reinforcement is disposed between the dissolvable film and a first one of the flexible membranes.

A layer of a coating is interposed between the interior dissolvable film and the second flexible membrane. The coating is allowed to at least partially cure before a resin is vacuum/pressure infused through and around the fiber reinforcement. The resin-filled structure is placed in a vacuum chamber where a vacuum is drawn which causes the structure to conform to the shape of the mold. The resin is then cured and the formed part is released from the reusable flexible membranes.

The flexible membranes can be any flexible material which is inert to the solvents and other chemicals used in the coatings and resins. The flexible resins should also provide good release from the cured molded article. Other desirable characteristics include sufficient strength and toughness to withstand multiple molding cycles. A preferred suitable material for the flexible membranes is silicon in the form of flat sheets approximately 0.63 cm (¼ in.) thick. The sheet thickness is determined based on factors such as the size of the part and the desired fineness of the details. Preferably, the flexible membrane has a glossy surface finish for contact with the coating.

The interior dissolvable film must dissolve quickly in the solvents used for the molding resin but must not dissolve, or dissolve only slowly, in the solvents used in the coating resin. Styrene homopolymers or copolymers, and more particularly polystyrene is a good choice for the interior film because it dissolves rapidly (on the order of a few seconds) in styrene monomer, which is the common solvent for molding resins used in the composite industry. One skilled in the art can easily determine other suitable film materials in the event that polystyrene is undesirable for some reason or another solvent is used for the resin. The interior film needs to be thick enough to contain the coating during application and curing but is preferably as thin as allowable under this criterion, in order to facilitate subsequent dissolving upon contact with the molding resin.

The reinforcement is a strong, relatively inert material which is molded into plastics to improve strength, stiffness and impact resistance. Reinforcement usually comprises fibers of glass, carbon, boron mineral, synthetic polymer, ceramic, textile, sisal, cotton, etc. The reinforcement is typically used in woven or nonwoven form, such as a cloth or mat, to facilitate application of uniform amounts of the reinforcement throughout the part.

Typical composite molding resins usable for this invention include or may be selected from at least one of unsaturated polyesters, vinylesters, or acrylics such as acrylic acrylated resins. These resins may be made by any of the methods known in the art. Such resins are normally hard and glass-like solids. The solid resins are dissolved in a solvent for use in molding operations. The solvent is preferably a monomer that can react with the unsaturated bonds of the resin to form a cured thermoset resin. The reactive monomer is almost always styrene, although other monomers like styrene derivatives, such as alpha methyl styrene, vinyl toluene or other monomers like methyl methacrylate, can also be used. All of these reactive monomers are also strong solvents for polystyrene which is preferred as the interior film. The resins will also contain catalysts and/or initiators to start the curing reaction upon the application of heat, light, or redox initiators such as peroxides or azo compounds.

The coating resin may be selected from at least one of: an unsaturated polyester, acrylic like acrylic acrylated resin, vinylester or epoxy resin. The coating needs to be flexible after curing because, as explained below, the coating will be at least partially cure as a flat layer prior to being formed around a mold. Flexible cured coating resins are well-known in the art and one skilled in the art can easily make or obtain a coating resin having the desired flexibility. One advantage of the current process is that coating systems that are oxygen-inhibited can be used because the coating cures between two solid surfaces. The coating may be UV curable or peroxide curable by any of the methods well-known in the art. Preferably, the coating resin will retain some unsaturated sites after curing to allow for reactive bonding between the coating and the resin.

The coating resin should be dissolved in a reactive monomer that is not a good solvent for the material of the inner film. For example, the preferred inner film material is polystyrene which is highly nonpolar. Solvents having some degree of polarity will dissolve the nonpolar polystyrene slower than nonpolar, particularly nonpolar aromatic, solvents. Therefore, a suitable choice for the coating solvent would be a relatively polar solvent like an ethoxylated multifunctional acrylate monomer. For example, a polystyrene film was found to lose structural strength after 2 minutes of contact with hexanediol diacrylate but maintained its strength for 22 minutes in tripropylene glycol dimethacrylate. Additionally, a gel coat consisting of about equal parts polyester resin, hexanediol diacrylate, and tripropylene glycol dimethacrylate cured in 18 minutes which was a sufficiently short enough time that a polystyrene film in contact with the curing gel coat maintained its strength.

The inventive process can be practiced with a device as shown in FIG. 1. Although the coating may be applied to either membrane, for the purpose of illustration and clarity, the following discussion will describe an embodiment where the bottom membrane is coated. A top sealing frame 11 and a bottom sealing frame 13 are arranged opposite each other. The top sealing frame 11 and bottom sealing frame 13 are moveable from a first, open position, as shown, to a second, closed position (shown in FIG. 2). While in the open position, a top flexible membrane 15 and a bottom flexible membrane 17 are suspended through the gap between the top sealing frame 11 and the bottom sealing frame 13. When in the closed position, top sealing frame 11 and bottom sealing frame 13 clamp the top flexible membrane 15 against the bottom flexible membrane 17 to form an air-tight seal. Top flexible membrane 15 is pierced by at least one gate (or inlet) 19 and at least one vent (or outlet) 21. The gate 19 is connected to a source (not shown) of the resin. The vent 21 is connected to a vacuum source (not shown). The sealing frames 11, 13 and suspended membranes 15, 17 are positioned over a vacuum chamber 29 having a mold 31.

In one preferred embodiment, the coating is applied to bottom flexible membrane 17 to form a coating layer 23. The coating may be applied by any technique used in the art, typically by spraying. An interior film 25 is placed over coating layer 23 and reinforcement 27 is placed over interior film 25. Top sealing frame 11 and bottom sealing frame 13 are then moved into the closed position and coating layer 23 is allowed to at least partially cure.

Figure 2:
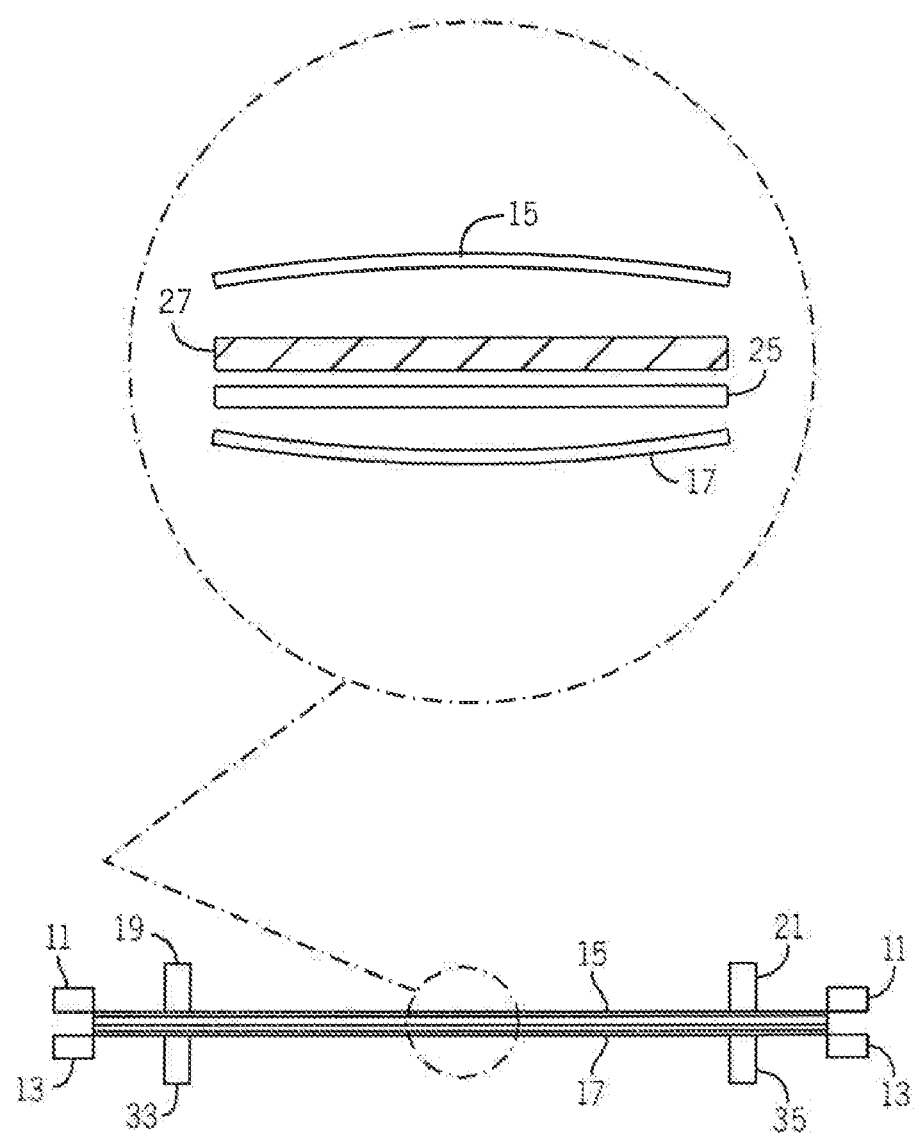
FIG. 2 shows a schematic view of a device for practicing another preferred embodiment of the method of the invention.

In an alternative preferred embodiment, shown in FIG. 2, the coating is not applied to bottom membrane 17. Rather, interior film 25 is placed directly over bottom membrane 17 and reinforcement 27 is placed over interior film 25. Top sealing frame 11 and bottom sealing frame 13 are then moved into the closed position. Bottom flexible membrane 17 is provided with an inlet gate 33 and an outlet vent 35. A vacuum is applied through outlet vent 35 which draws a premeasured shot of coating into the gap between bottom flexible membrane 17 and interior film 25. The force of the vacuum causes the coating to distribute into a uniformly thick layer. The coating layer is then allowed to at least partially cure.

After either embodiment above, a vacuum is applied to vent 21 which draws resin into the gap between interior film 25 and top flexible membrane 15 and causes the resin to diffuse through reinforcement 27. The solvents in the resin dissolve interior film 25 rapidly, typically in seconds. Another vacuum is then applied in vacuum chamber 29 which causes top flexible membrane 15 and bottom flexible membrane 17, along with all of the materials arrayed between these two membranes, to deflect downward and conform to the shape of the mold. The resin is then allowed to cure. After curing, the vacuum chamber vacuum is released, the top sealing frame 11 and the bottom sealing frame 13 are moved to the open position, and the coated molded article is removed from between flexible membranes 15 and 17.

The present invention can be illustrated, but without limitation, by the following examples:

EXAMPLE 1

Figure 3:
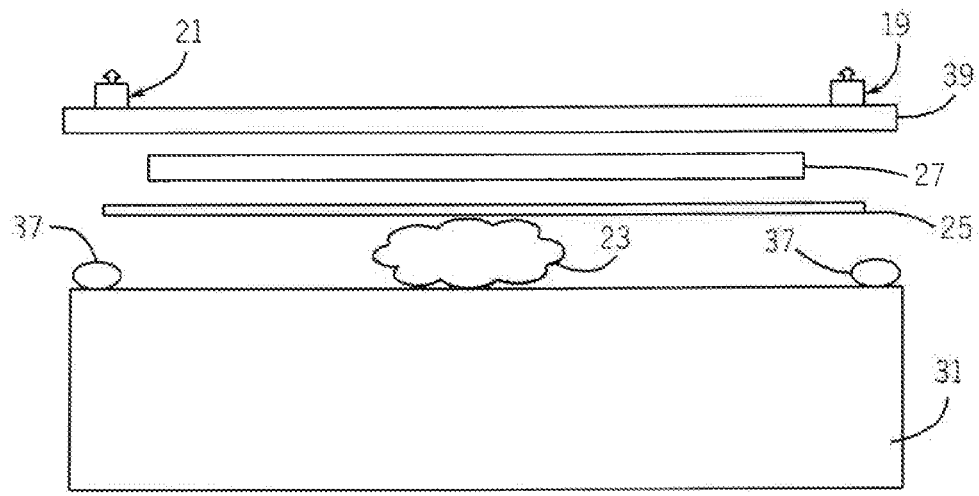
FIG. 3 shows a schematic drawing of a bag infusion process.

A zero HAP (Hazardous Air Pollutant) in mold coating B389P50 23 was spray applied to a flat glossy composite mold, having a tacky tape 37 positioned on the mold 31. The composite mold (2'X 3') contained internal heating coils (FIG. 3). The mold surface temperature was 53° C. The cured coating 23 was then covered with a sheet of 76 microns (3 mil) thermoplastic film (PS) 25. Two layers of dry 0.46 kg/m² (1.5 ounce per square foot) chopped strand mat (CSM) fiberglass reinforcement 27 was then placed over the thermoplastic film 25. Next, the fiberglass reinforcement 27 was saturated with a conventional unsaturated polyester laminating resin (Polycor 939X110) and rolled into the fiberglass reinforcement 27 using a hand lay-up roller. The laminating resin was allowed to cure and the gel coated part was removed from the composite mold 31. The coating 23 was glossy and the part was comparable in appearance to a commercial grade of unsaturated polyester gel coat. The adhesion between the coating was checked and determined to be excellent. The thermoplastic film 25 was completely dissolved by the laminating resin.

EXAMPLE 2

Figure 4:
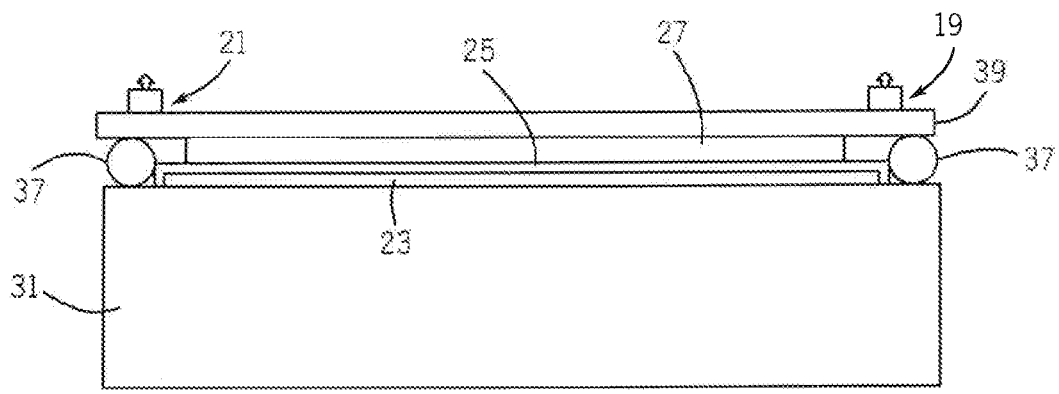
FIG. 4 shows a schematic drawing of a composite mold.

A low HAP (Hazardous Air Pollutant) in mold coating B505-80 23 was poured onto the center of a flat glossy composite mold 31. The composite mold 31 contained internal heating coils. The mold surface temperature was 50° C. The wet coating 23 was them covered with a sheet of 76 microns (3 mil) thermoplastic film (PS) 25, and two layers of dry 0.46 kg/m² (1.5 ounce per square foot) chopped strand mat (CSM) fiberglass reinforcement 27. Next a vacuum bag film 39 was placed over the fiberglass reinforcement 27 (see FIG. 3). A light vacuum was used to spread the coating 23 over the mold surface. The vacuum bag 39 was thin and wrinkled when the vacuum was applied. The wrinkling produced a coating 23 with uneven film thickness. The coating 23 was allowed to cure. The laminating resin was applied to the coating 23 by a well known bag infusion process (see FIG. 4). The part was removed from the composite mold 31. The coating 23 was glossy and the part was comparable in appearance to a commercial grade of unsaturated polyester gel coat. The adhesion between the coating 23 was checked and determined to be excellent. The thermoplastic film 25 was completely dissolved by the laminating resin.

EXAMPLE 3

Identical to example 2 except the coating was brush applied to the mold.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of making a coated composite article, the method comprising: positioning a dissolvable inner film to at least temporarily isolate a coating resin composition from a molding resin composition,
   wherein
   the inner film is insoluble or only slowly soluble in the coating resin composition and is rapidly soluble in the molding resin composition,
   the coating resin composition comprises a reactive monomer that is not a good solvent for the inner film, and
   the molding resin composition comprises at least one reactive solvent selected from monomers which strongly dissolve the inner film.

2. The method of claim 1, wherein the inner film comprises a styrene polymer or copolymer.

3. The method of claim 2, wherein the inner film comprises polystyrene.

4. The method of claim 1, wherein the molding resin composition comprises a molding resin selected from the group consisting of unsaturated polyesters, vinyl esters and acrylic acrylated resins.

5. The method of claim 1, wherein the reactive monomer is a polar reactive solvent.

6. The method of claim 1, wherein the reactive monomer comprises an ethoxylated multifunctional acrylate monomer.

7. The method of claim 1, wherein the coating resin composition comprises a coating resin selected from the group consisting of unsaturated polyester acrylic acrylated resin, vinyl ester and epoxy resin.

8. The method of claim 1, wherein the reactive solvent is selected from the group consisting of styrene, styrene derivatives and methyl methacrylate.

9. The method of claim 1, wherein the inner film is positioned such that the coating resin composition is between and in contact with both a mold surface and the inner film.

10. The method of claim 1, further comprising applying the coating resin composition to a mold surface by spraying, brushing or vacuum infusion.

11. The method of claim 10, wherein the mold surface is a flexible membrane or a rigid surface.

12. The method of claim 1, further comprising allowing the coating resin composition to at least partially cure prior to contacting the inner film with the molding resin composition.

13. The method of claim 12, further comprising
   applying the molding resin composition to the inner film; and
   allowing the inner film to dissolve in the molding resin composition.

14. The method of claim 13, further comprising allowing the molding resin composition to cure.

* * * * *